(12) United States Patent
Bailey

(10) Patent No.: US 7,387,567 B1
(45) Date of Patent: Jun. 17, 2008

(54) ADJUSTABLE GAME CARCASS SPREADER DEVICE

(76) Inventor: Allen Bailey, 2713 Williamsburg Ct., Fort Collins, CO (US) 80521

( * ) Notice: Subject to any disclaimer, the term of this patent is extended or adjusted under 35 U.S.C. 154(b) by 24 days.

(21) Appl. No.: 11/561,752

(22) Filed: Nov. 20, 2006

(51) Int. Cl.
*A22B 5/06* (2006.01)

(52) U.S. Cl. .................................. 452/197

(58) Field of Classification Search ........ 452/189–192; 294/81.1, 81.2, 81.21, 81.3, 67.4, 74, 81.5, 294/81.56, 82.1, 81.54
See application file for complete search history.

(56) References Cited

U.S. PATENT DOCUMENTS

| 12,222 | A |  | 1/1855 | Tesh |  |
|---|---|---|---|---|---|
| 370,616 | A |  | 9/1887 | Folger |  |
| 2,710,766 | A | * | 6/1955 | Erlewine | 452/192 |
| 3,010,751 | A | * | 11/1961 | Day et al. | 294/81.2 |
| 4,909,555 | A | * | 3/1990 | Blasi | 452/189 |
| D345,780 | S |  | 4/1994 | Ream |  |
| 5,360,368 | A |  | 11/1994 | Hajek |  |
| 5,707,281 | A |  | 1/1998 | Hicks |  |
| 6,059,649 | A |  | 5/2000 | Ballard |  |
| 7,222,903 | B2 | * | 5/2007 | Tardiff | 294/81.21 |

* cited by examiner

*Primary Examiner*—Thomas Price
(74) *Attorney, Agent, or Firm*—Advantia Law Group; Michael W. Starkweather; Jason P. Webb

(57) ABSTRACT

An adjustable game carcass spreader device. There is a first tubular member; a second tubular member, slidably coupleable to the first tubular member, having a first pin aperture; a first adjustment system, including: a plurality of securing apertures, configured to secure a pin positioned therethrough; a first pin member, selectably extendable through one of the securing apertures; and a bias member coupled to the first pin member. There is a plurality of cap members, removably coupled to end portions of the device. There is a second adjustment system, including a third tubular member, rotatably coupled to the second tubular member. An end portion of the second tubular member and an end portion of the third tubular member are threaded. The first tubular member includes indicia thereon. There is a second pin aperture and a second pin member, the second pin member is selectably extendable through one of the securing apertures.

7 Claims, 2 Drawing Sheets

ADJUSTABLE GAME CARCASS SPREADER DEVICE

BACKGROUND OF THE INVENTION

1. Field of the Invention

The present invention relates to a game carcass spreader device, specifically to a adjustable game carcass spreader device.

2. Description of the Related Art

In the related art there is used, carcass spreader devices. When a person fells a deer, elk, moose or other large game there is usually a need to clean the entrails and other chest cavity organs from the interior of the felled game. When the entrails are removed there may be a need to use a device to expand or otherwise spread the chest cavity of the game so as to allow the cavity to cool. Additionally, there may be a need to spread the chest cavity so as to facilitate the final cleaning of the interior thereof. The length the spreader device used may need to vary because the size of game is likely to vary. The spreader device may need to be light weight because a may be difficult for a person hunting for game to travel long distances with a heavy spreader and because a person may have a great amount of gear to carry. When a spreader device is placed in the chest cavity of a felled game it is important for a spreader to hold the cavity open securely. Therefore, there is a need for a carcass spreader device which is adjustable and light weight, and securely and effectively holds open the chest cavity of felled game. Some improvements have been made in the field. Examples include but are not limited to the references described below, which references are incorporated by reference herein:

U.S. Pat. No. 6,059,649, issued to Ballard, discloses an animal carcass rib spreader and method of use. The rib spreader includes two carcass engaging members coupled to a frame. Each of the carcass engaging members is adapted to engage opposite halves of a rib cage of an animal carcass. A first carcass engaging member of the two carcass engaging members is mounted to a carriage unit. The carriage unit is coupled upon an elongate member of the frame by a mechanically progressive mechanism that is used for causing movement relative to that elongate member. The mechanically progressive mechanism is engaged upon the elongate member and configured for manual actuation. The mechanically progressive mechanism incrementally advances the first carcass engaging member away from a second carcass engaging member for spreading the rib cage of the animal carcass. Preferably, the mechanically progressive mechanism is a ratchet mechanism driven by a pivotable actuator of a handle assembly that is connected to the carriage unit. The handle assembly includes a leverage extension configured to permit a user to manually grasp the leverage extension and the pivotable actuator in one hand thereby facilitating a squeeze action by a user of the handle assembly for mechanically spreading the rib cage of the animal carcass. A release mechanism is associated with the mechanically progressive mechanism for disengaging the mechanically progressive mechanism from locked engagement with the elongate member of the frame. This allows the first carcass engaging member to return toward the second carcass engaging member for disengaging the carcass engaging members from the animal carcass. Preferably, the release mechanism is a depressible lever configured for permitting a user to disengage the mechanically progressive mechanism using the same single hand utilized to actuate the mechanically progressive mechanism.

U.S. Pat. No. 5,707,281, issued to Hicks, discloses an improved animal carcass spreader which comprises a crossbar with spreader arms mounted thereon. The spreader arms are curvilinear members having end portions with spikes mounted thereon for spreading the ribs of an animal. One of the spreader arms is fixedly mounted at the distal end of the crossbar, while the opposing spreader arm is slidably mounted. The slidable spreader arm is provided with a handle and a ratchet lever. The ratchet lever permits travel of the slidable spreader arm only in a direction away from the fixed spreader arm unless said ratchet lever is manually disengaged by squeezing the ratchet lever towards the handle and a raised stopper is provided to prevent the ratchet lever from sliding completely off the crossbar.

U.S. Pat. No. 4,909,555, issued to Blasi, discloses an adjustable animal gambrel having a pair of telescopic members. An impaling hook is slidably secured within an end of each of the pair of telescopic members. Each of the impaling hooks has a knob and an off-set eyelet. A retainer pin keeps the telescopic members from sliding with respect to each other.

U.S. Pat. No. 5,360,368, issued to Hajek, discloses a wild game dressing tool comprising two outwardly spaced apart hooks for field dressing a deer or the like, eliminating the need for reaching up into an animal's rib cage blindly, consequently eliminating excessive blood on the field dresser's arms and clothing, and most importantly reduces the risk of contracting lymes disease.

U.S. Design Pat. No. 345,780, issued to Ream, discloses the ornamental design for a gambrel for game animals.

The inventions heretofore known suffer from a number of disadvantages which may include: being unduly complex and/or difficult to use, being limited in its use, being heavy, being very expensive, and/or otherwise failing to provide a convenient, durable, adjustable, and/or safe means for securing open the chest cavity of felled game.

What is needed is an adjustable game carcass spreader device that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available game carcass spreaders. Accordingly, the present invention has been developed to provide an adjustable game carcass spreader device.

In one embodiment, there is an adjustable game carcass spreader device. There may be a first tubular member; there may be a second tubular member, which may have a proximal end portion disposed interior to a distal end portion of the first tubular member, which may be slidably coupleable to the distal end portion of the first tubular member, and/or may have a first pin aperture disposed through the second tubular member; there may be a first adjustment system, configured to adjust the length of the adjustable game carcass spreader device, the first adjustment system may include: a plurality of securing apertures, which may be disposed in and aligned longitudinally along the first tubular member, and/or may be configured to secure a pin positioned therethrough; and/or a first pin member, which may extend through the first pin aperture and/or be oriented substantially orthogonal thereto. The first pin member may be selectably extendable through one of the securing apertures; and/or may include a bias member, which may be disposed interior to the proximal end portion of the second tubular member, and/or which may be coupled to the first pin member, and/or may be configured to bias the first pin member.

The adjustable game carcass spreader device may include indicia thereon, which may be disposed proximate to the securing apertures, and/or may be configured to provide position indicia. There may be a plurality of cap members, which may be removably coupled to each of a proximal end portion of the adjustable game carcass spreader device first tubular member and/or a distal end portion of the adjustable game carcass spreader device.

The adjustable game carcass spreader device may further comprise a second adjustment system, which may include a third tubular member, which may have a proximal end portion disposed interior to a distal end portion of the second tubular member, and/or may be rotatably coupled to the distal end portion of the second tubular member. Further, the distal end portion of the second tubular member and the proximal end portion of the third tubular member may be threaded.

The first adjustment mechanism may include a second pin aperture, which may be substantially identical to the first pin aperture. There may be a second pin member, which may be substantially identical to the first pin member coupled to an opposing end of the biasing member. The second pin member may extend through the second pin aperture and/or be oriented substantially orthogonal thereto, and/or the second pin member may be selectably extendable through one of the securing apertures.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
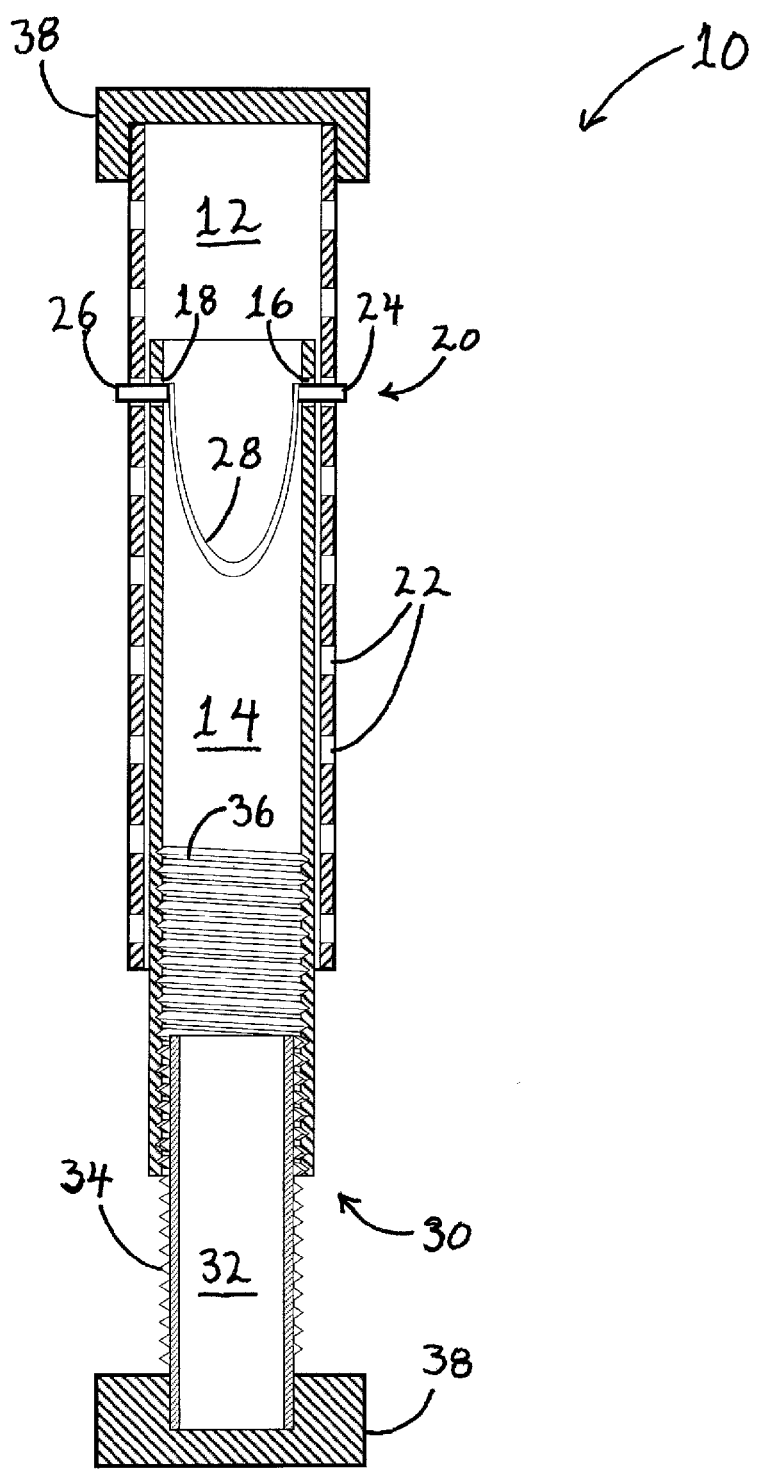
FIG. 1 illustrates a cross-sectional view of an adjustable game carcass spreader device, according to one embodiment of the invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Figure 2:
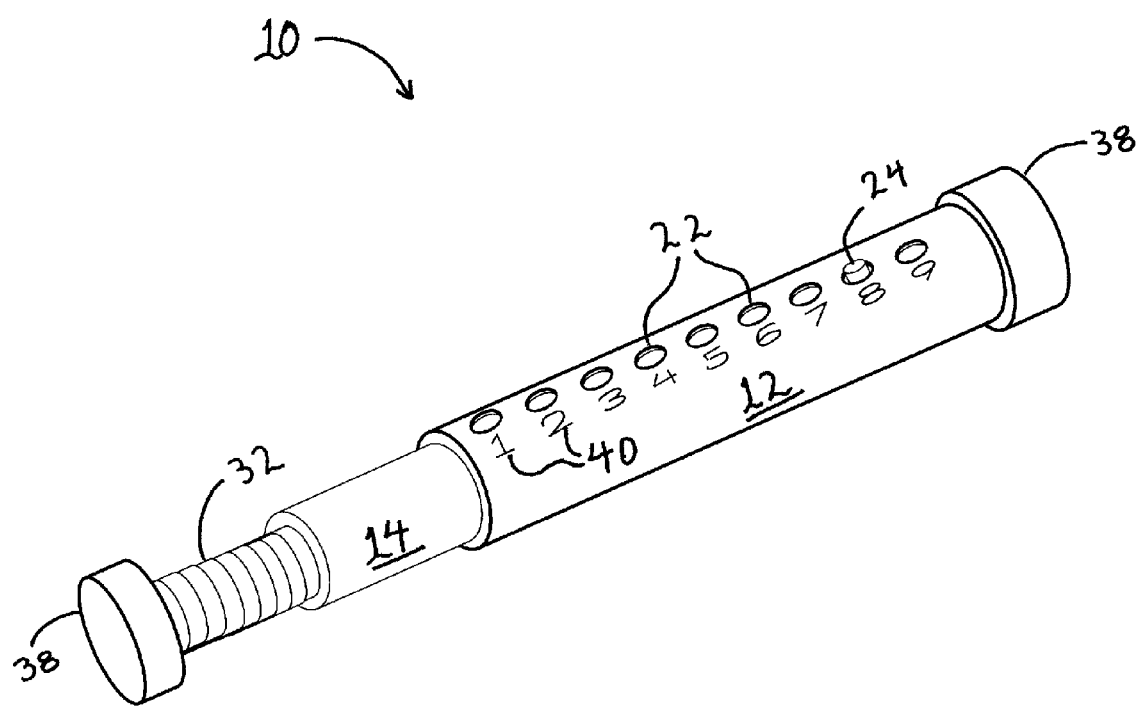
FIG. 2 illustrates a side perspective view of an adjustable game carcass spreader device, according to one embodiment of the invention.

Looking to all figures, there is hereafter set forth a detailed description of an embodiment of an adjustable game carcass spreader device 10. FIG. 1 illustrates a cross-sectional view of an adjustable game carcass spreader device 10, according to one embodiment. FIG. 2 illustrates a side perspective view of an adjustable game carcass spreader device 10, according to another embodiment.

As shown in the figures, there is an adjustable game carcass spreader device 10, which includes a first tubular member 12. The first tubular member 12 is an elongated tube with a uniform diameter end to end. In one embodiment, the first tubular member 12 is composed of a rigid material. Further, the adjustable game carcass spreader device 10 includes a second tubular member 14 which is an elongated tube having a uniform diameter end to end. As illustrated, the second tubular member 14 has a proximal end portion disposed interior to a distal end portion of the first tubular member 12. The diameter of the first tubular member 12 is greater than that of the second tubular member 14 such that the second tubular member 14 is insertable into first tubular members 12, wherein the tubular members are slidably coupleable to each other.

As illustrated in the Figures, the second tubular member 14 includes a first pin aperture 16 and a second pin aperture 18 disposed in the proximal end of the second tubular member 14. The first pin aperture 16 is axially aligned with the second pin aperture 18, and is disposed through an opposite wall of the second tubular member 14 from where the second pin aperture 18 is located. The first pin aperture 16 and second pin aperture 18 are part of a first adjustment system 20.

As illustrated in the figures, the first adjustment system 20 further includes a plurality of securing apertures 22, a first pin member 24, a second pin member 26, and a bias member 28. The plurality of the securing apertures 22 are disposed through the first tubular member 12, and are aligned longitudinally there-along. In one embodiment, the securing apertures 22 are disposed on opposing sides of the first tubular member 12; one row directly opposite the other row. Each securing aperture 22 in a row is axially aligned with a securing aperture 22 in a row oppositely disposed.

As shown in the Figures, the first pin member 24, of the first adjustment system 20, extends through the first pin aperture 16 and is oriented substantially orthogonal thereto. The first pin member 24 is substantially orthogonal so as to be selectably extendable through the first pin aperture 16 and a securing aperture 22 without unduly binding against surfaces of the apertures 16, 22. According to one embodiment, the first pin member 24 is a solid cylinder. In alternative embodiments, the first pin member may be shaped and/or structured differently. For example, hollow cylinder, square shaped, etc.

As illustrated in the Figures, the second pin member 26, of the first adjustment system 20, is disposed extending through the second pin aperture 18 and is oriented substantially orthogonal thereto. The second pin member 26 is substantially orthogonal so as to be selectably extendable through the second pin aperture 18 and a securing aperture 22 without unduly binding against surfaces of the apertures, 18 and 22. In alternative embodiments, the second pin member may be shaped and/or structured differently. For example, hollow cylinder, square shaped, etc.

As shown in the Figures, the bias member 28, of the first adjustment system 20, is disposed interior to the proximal end portion of the second tubular member 14. The bias member 28 is a thin flat resilient material with a u-shape profile. At one end portion of the bias member 28, the first pin member 24 is coupled thereto extending orthogonal therefrom. At another end portion of the bias member 28, the second pin member 26 is coupled thereto extending orthogonal therefrom. Further, the first pin member 24 and second pin member 26 are coupled to the bias member 28 such that the pin members, 24 and 26 are axially aligned and are disposed oppositely from each other.

As illustrated in the Figures, the adjustable game carcass spreader device 10 includes a second adjustment system 30. In one embodiment, the second adjustment system 30 comprises a third tubular member 32 with a threaded surface 34 disposed upon the external surface thereof. The third tubular member 32 has a proximal end portion which is disposed interior to a distal end portion of the second tubular member 14. The third tubular member 32 is rotatably coupled to a thread receiving surface 36 disposed interior to the second tubular member 14. The threaded surface 34 of the third tubular member 32 is shaped so as to couple by a rotational motion into the thread receiving surface 36 of the second tubular member 14.

The Figures show a plurality of cap members 38, where one is disposed upon the proximal end portion of the first tubular member 12; another is disposed upon the distal end portion of the third tubular member 32. The cap members 38 generally have a cylindrical shape, and further have an external diameter greater than the diameter of the respective tubular members; 12, 14 and 32. Further, the cap members 38 have an interior bore which couples with the respective end portion of the respective tubular member, 12 and 32. The cap members 38 are composed of a compliant material.

As shown in FIG. 2, there are indicia 40 disposed upon an external surface of the first tubular member 12. The indicia 40, is disposed proximate to the securing apertures 22 of the first tubular member 12. The indicia 40 proximate to each securing aperture 22 is different than all other indicia 40 on the same side of the first tubular member 12; so as to identify each securing aperture 22 as a distinct position. According to one embodiment, there are indicia 40 on both sides of the first tubular member 12 corresponding to the securing aperture 22 thereat. The indicia 40 at each securing aperture 22 are equivalent to the indicia 40 of the directly opposing securing aperture 22 of the other side of the first tubular member 12.

In operation, a user may grip the first tubular member 12 with one hand. A user may press the first pin member 24 with a finger so as to cause it to be disposed interior to the first tubular member 12. With another finger a user may press the second pin member 26 so as to cause it to be disposed interior to the first tubular member 12. When the first and second pin members, 24 and 26, are displaced so as to not contact any securing aperture 22 a user may grip the second or third tubular member, 14 or 32, and pull away from or push towards first tubular member in a direction allowing relative slidable motion; thus expanding or collapsing the device 10. When a user expands or collapses the device to a desired length a user may allow the pin members, 24 and 26 to engage with a desired set of corresponding securing apertures 22. To allow the pin members, 24 and 26 to engage with securing apertures a user may release their pressure from pushing the pin members to an interior position, thus allowing the bias member 28 to restore the pin members to a position engaged with securing apertures 22. A user may use the indicia 40 on the device to help know which length setting may be preferred.

In operation a user may press the pin members, 24 and 26, interior to the first tubular member, then twist the second tubular member 14 relative to the first tubular member 12, so that the pin members, 24 and 26 are biased against an interior wall of the first tubular member 12. A user may extend or collapse the first and second tubular members, 12 and 14, relative to each other, then twist the tubular members, 12 and 14, until the pin members, 24 and 26, align with securing apertures 22 allowing the pins to extend through the desired securing apertures 22.

In operation, a user may adjust the length of the device 10 by twisting the second and third tubular member, 14 and 32, relative to each other such that expanding or collapsing thereof occurs. A user may place the device 10 in the chest cavity of a game carcass so as to expand the rib walls of the game, by positioning the device 10 lengthwise, so as to be lateral in the chest cavity of the carcass. A user may position the device 10 so as to have the cap members 38 make contract with opposing interior walls of the games chest cavity. A user may remove the cap members 38 from the device 10 by pulling, twisting, or both. A user may clean removed cap members 38 then replace the cap members 38 on the device 10. A user may remove old cap members 38 and replace with new and/or differently formed cap members 38. When the device 10 is positioned in the chest cavity of a game, a user may make adjustments to the length of the device by twisting the second tubular member 14 relative to the third tubular member 32. A user may collapse the device 10 to its smallest length by positioning the pin members, 24 and 26, in the most proximate set of securing holes 22 and the user may twist the third tubular member 32 into the second tubular member 14 to the most compact position.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

For example, although the Figures show embodiments of the device, the size proportion of the components relative to each other may be varied and still satisfy the intended functionality of the device. The length of the each tubular member may be varied, as well as the diameter provided that each tube couples according to that described in the claims.

Additionally, although the Figures illustrates nine securing apertures in the first tubular member on each side thereof, such is not determinative on how many securing apertures there may be. It is intended that the number of apertures may be varied.

Finally, it is envisioned that the components of the device may be constructed of a variety of materials which may include: plastics such as polypropylene, polyethylene, polycarbonate, acrylics, rubber, silicone-nitrile and/or composites thereof; metals such as steel, aluminum, nickel, titanium, tin, and/or composites thereof; and/or composites of various weaves of fiber lay-ups infused with resin.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. An adjustable game carcass spreader device, comprising:
    a) a first tubular member;
    b) a second tubular member, having a proximal end portion disposed interior to a distal end portion of the first tubular member, slidably coupleable to the distal end portion of the first tubular member, and having a first pin aperture disposed through the second tubular member;
    c) a first adjustment system, configured to adjust the length of the adjustable game carcass spreader device, the first adjustment system including:
        c1. a plurality of securing apertures, disposed in and aligned longitudinally along the first tubular member, and configured to secure a pin positioned therethrough; and
        c2. a first pin member, extending through the first pin aperture and oriented substantially orthogonal thereto, the first pin member selectably extendable through one of the securing apertures; and
        c3. a bias member, disposed interior to the proximal end portion of the second tubular member, and coupled to the first pin member, and configured to bias the first pin member;
    d) a plurality of cap members, removably coupled to each of a proximal end portion of the adjustable game carcass spreader device first tubular member and a distal end portion of the adjustable game carcass spreader device.

2. The adjustable game carcass spreader device of claim 1, further comprising a second adjustment system, including a third tubular member, having a proximal end portion disposed interior to a distal end portion of the second tubular member, and rotatably coupled to the distal end portion of the second tubular member.

3. The adjustable game carcass spreader device of claim 2, wherein the distal end portion of the second tubular member and the proximal end portion of the third tubular member are threaded.

4. The device of claim 1, wherein the first tubular member includes indicia thereon, disposed proximate to the securing apertures, and configured to provide position indicia.

5. The device of claim 1, wherein the first adjustment mechanism includes:
    a) a second pin aperture, substantially identical to the first pin aperture,
    b) a second pin member, substantially identical to the first pin member coupled to an opposing end of the biasing member, the second pin member extending through the second pin aperture and oriented substantially orthogonal thereto, and the second pin member selectably extendable through one of the securing apertures.

6. An adjustable game carcass spreader device, consisting essentially of:
    a) a first tubular member;
    b) a second tubular member, having a proximal end portion disposed interior to a distal end portion of the first tubular member, slidably coupleable to the distal end portion of the first tubular member, and having a first pin aperture disposed through the second tubular member;
    c) a first adjustment system, configured to adjust the length of the adjustable game carcass spreader device, the first adjustment system including:

c1. a plurality of securing apertures, disposed in and aligned longitudinally along the first tubular member, and configured to secure a pin positioned therethrough; and c2. a first pin member, extending through the first pin aperture and oriented substantially orthogonal thereto, the first pin member selectably extendable through one of the securing apertures; and c3. a bias member, disposed interior to the proximal end portion of the second tubular member, and coupled to the first pin member, and configured to bias the first pin member.

d) a plurality of cap members, removably coupled to each of a proximal end portion of the adjustable game carcass spreader device first tubular member and a distal end portion of the adjustable game carcass spreader device;

e) a second adjustment system, configured to further adjust the length of the adjustable game carcass spreader device, the second adjustment system including: a third tubular member, having a proximal end portion disposed interior to a distal end portion of the second tubular member, and rotatably coupled to the distal end portion of the second tubular member, wherein the distal end portion of the second tubular member and the proximal end portion of the third tubular member are threaded; and f) indicia, disposed upon and proximate to the securing apertures of the first tubular member, and configured to provide position indicia.

7. The device of claim 6, wherein the first adjustment mechanism includes:

a) a second pin aperture, substantially identical to the first pin aperture, b) a second pin member, substantially identical to the first pin member coupled to an opposing end of the biasing member, the second pin member extending through the second pin aperture and oriented substantially orthogonal thereto, and the second pin member selectably extendable through one of the securing apertures.

* * * * *